United States Patent [19]
Kohzai et al.

[11] 4,450,393
[45] May 22, 1984

[54] SPINDLE ORIENTATION CONTROL APPARATUS

[75] Inventors: Yoshinori Kohzai, Hino; Yoshiki Fujioka, Higashiyamato; Naoto Ota, Hino, all of Japan

[73] Assignee: Fujitsu Fanuc Limited, Tokyo, Japan

[21] Appl. No.: 316,762

[22] Filed: Oct. 30, 1981

[30] Foreign Application Priority Data

Oct. 30, 1980 [JP] Japan .................. 55-152702

[51] Int. Cl.$^3$ ............................................. G05B 11/18
[52] U.S. Cl. .................................... 318/592; 318/561; 318/653
[58] Field of Search ............... 318/592, 561, 653

[56] References Cited
U.S. PATENT DOCUMENTS 3,824,891 7/1974 Carroll .............................. 409/231
4,207,504 6/1980 Kawada et al. .................... 318/561
4,350,939 9/1982 Rodriguez ......................... 318/592

Primary Examiner—B. Dobeck
Attorney, Agent, or Firm—Staas & Halsey

[57] ABSTRACT

A speed control circuit and position control circuit are connected to a spindle drive motor in a machine tool or the like in order to drive the spindle at a predetermined speed and stop the spindle at a predetermined angular position. When an orientation command is issued while the spindle is being rotated at the predetermined speed by a speed control loop, a speed command signal from a speed command circuit is interrupted, the speed reduced to zero, and an initially set voltage is then employed as a speed command to rotate the spindle by a predetermined amount. Next, a integral value of the actual spindle speed is employed as the speed command to further rotate the spindle by a predetermined amount. When this has been accomplished, a constant bias voltage of a low level replaces the speed command, thereby to rotate the spindle still further by a predetermined amount until a specified portion of the spindle approaches extremely close to the predetermined angular position. At this point a signal, sensed by a magnetic body provided on the specified portion of the spindle and a sensing circuit confronting the magnetic body, is employed as the speed command signal of the speed control circuit, the sensed signal having a gradually decreasing waveform which attains a value of zero when the specified portion of the spindle is stopped at the predetermined angular position. Using this signal gradually decelerates the spindle motor to stop the spindle accurately at the desired angular position.

4 Claims, 10 Drawing Figures

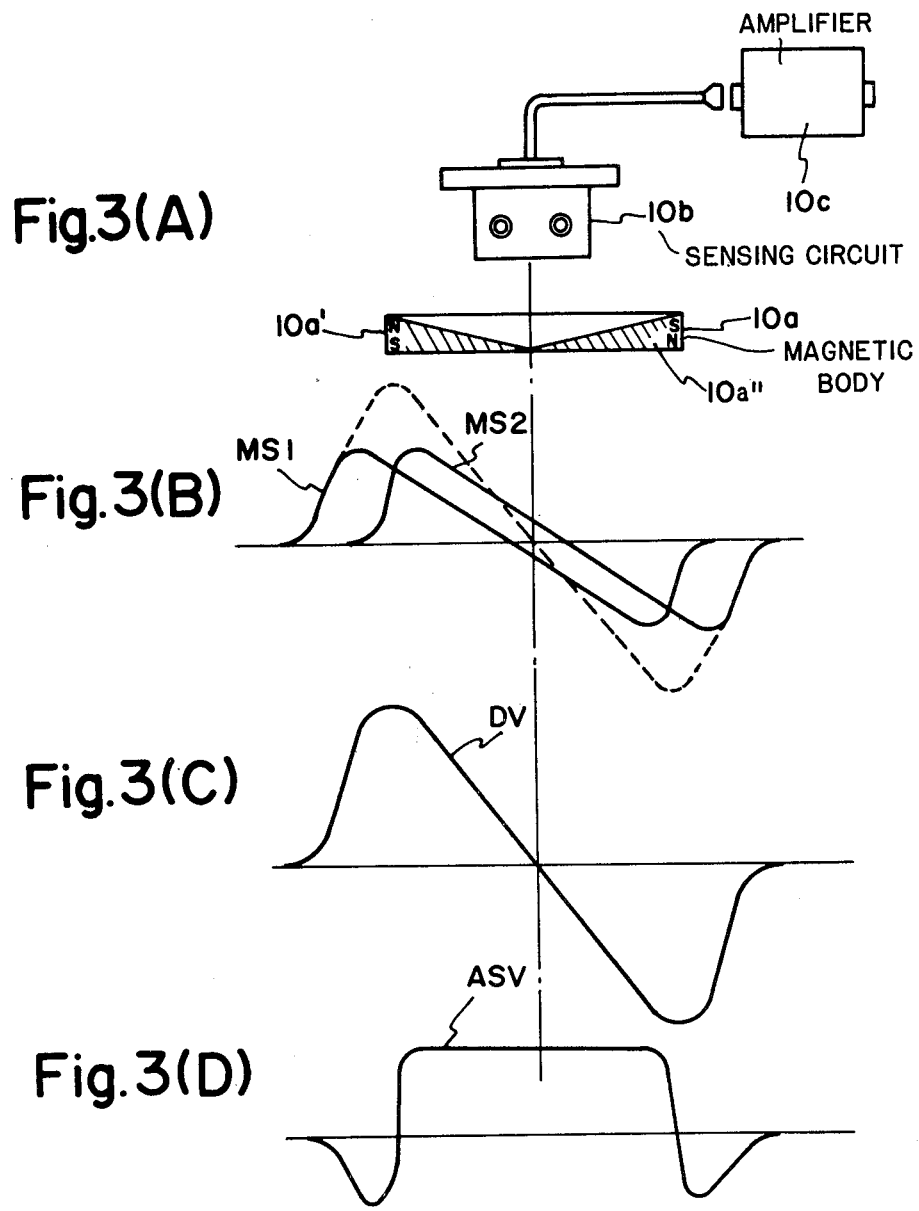

SPINDLE ORIENTATION CONTROL APPARATUS

CROSS REFERENCE TO RELATED APPLICATIONS

U.S. Applications: U.S. Ser. No. 190,660, filed Sept. 25, 1980, now U.S. Pat. No. 4,345,192; U.S. Ser. No. 190,661, filed Sept. 25, 1980, now U.S. Pat. No. 4,342,950; U.S. Ser. No. 190,659, filed July 25, 1980, now U.S. Pat. No. 4,379,987; U.S. Ser. No. 201,314, filed Oct. 27, 1980, now U.S. Pat. No. 4,386,305; U.S. Ser. No. 215,631, filed Dec. 12, 1980, now U.S. Pat. No. 4,359,676, filed Dec. 12, 1980; U.S. Ser. No. 216,836, filed Dec. 15, 1980, now U.S. Pat. No. 4,374,350; and U.S. Ser. No. 216,837, filed Dec. 15, 1980, now U.S. Pat. No. 4,403,181.

BACKGROUND OF THE INVENTION

This invention relates to a spindle orientation control apparatus employing a magnetic sensor and, more particularly, to a spindle orientation control system having a simplified magnetic sensor contruction, and which enables the spindle to be stopped at a predetermined orientation with a high degree of accuracy.

Machine tools with an automatic tool change function are well known in the art. These are machine tools perform machining work automatically while various tools are changed, automatically. In order to smoothly mate a desired tool with the machine tool spindle, it is necessary to stop a specified portion of the spindle at a predetermined commanded angular position with a high degree of accuracy. The same is true for boring-type machine tools when inserting a boring rod into a hole previously drilled in a workpiece. Thus the need to accurately stop a specified portion of a spindle at a predetermined angular position or orientation is quite common in mechanical machining operations.

It is conventional practice to stop a spindle at a predetermined orientation by using a mechanical control mechanism or pin mechanism. However, the pin, which serves as the stopping member, can be damaged by an externally applied force or by a machine malfunction, and the control mechanism is subject to wear due to the effects of friction. Such phenomena make it impossible to stop the spindle at the predetermined orientation, thereby impeding the smooth changing of tools or the insertion of boring rods. Avoiding the above usually entails troublesome maintenance and inspection work as well as the frequent replacement of parts.

The present invention therefore seeks to provide a spindle orientation control system which is capable of accurately stopping a specified portion of a spindle at a predetermined angular position through purely electrical means, which allows the use of a contactless magnetic sensor as position deviation signal generating means, and which simplifies the construction of the magnetic sensor.

SUMMARY OF THE INVENTION

Accordingly, an object of the present invention is to provide electrical means for accurately stopping the spindle motor of a machine tool at a predetermined angular position.

Another object of the present invention is to provide a spindle orientation control apparatus in which the angular position or orientation of a spindle is sensed by means comprising a magnetic body provided on a specified portion of the spindle, and a sensor provided to sense the magnetic body, the spindle drive motor being brought to a stop gently at a predetermined orientation by the gradually diminishing output of the sensing means.

Still another object of the present invention is to provide a spindle orientation control apparatus in which hunting and overshoot are prevented when stopping the spindle at a predetermined orientation, by adjusting the gain of a circuit for producing a command signal supplied to a speed control circuit, the adjustment being made in accordance with the reduction ratio of gears coupling the spindle to the spindle drive motor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is an illustrative view useful in describing a magnetic sensor;

DESCRIPTION OF THE PREFERRED EMBODIMENT

Figure 1:
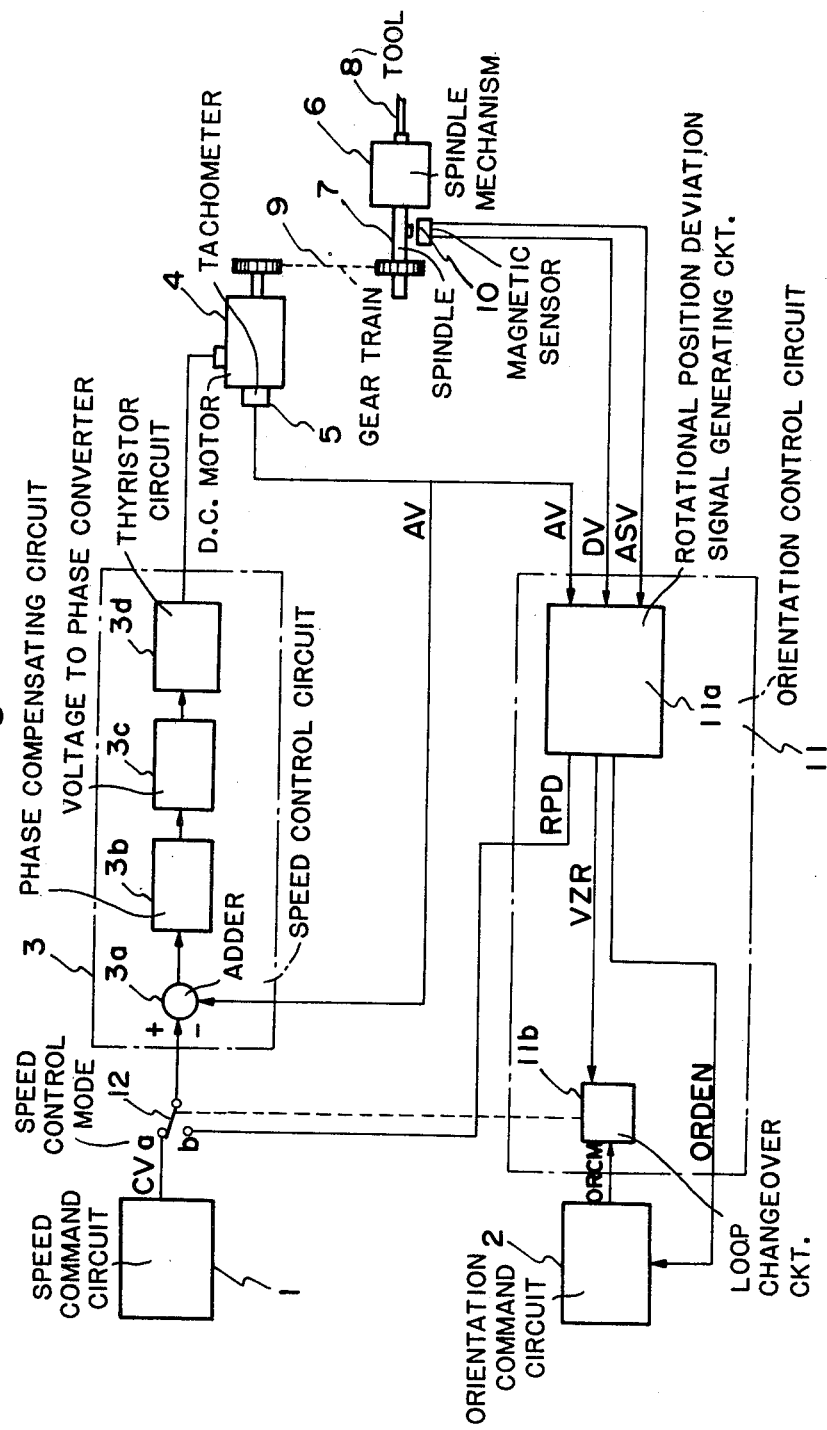
FIG. 1 is a block diagram illustrating a control apparatus embodying the present invention for stopping a spindle at a predetermined angular position.

Referring to FIG. 1, the orientation control apparatus includes a speed command circuit 1 for producing a speed command signal CV, and an orientation command circuit 2 for producing an orientation command signal ORCM. The speed control circuit 3 includes an adder 3a, a phase compensating circuit 3b, a voltage-to-phase converter 3c, and a thyristor circuit 3d. The adder 3a is adapted to deliver a difference voltage (Speed deviation) between the commanded speed CV and the actual motor speed AV in a speed control mode, and to deliver a difference voltage between an orientation or rotational position deviation signal RPD and the actual speed signal AV. The phase compensatiing circuit 3b subjects the output voltage of the adder 3a to a phase compensation by advancing or retarding its phase. The voltage-to-phase converter 3c controls the firing angle of each thyristor in the thyristor circuit 3d in accordance with the output voltage of the phase compensating circuit 3b. The thyristor circuit 3d operates in accordance with the controlled firing pulses to vary the value of a voltage applied to a DC motor 4, thereby to regulate the speed at which the motor 4 rotates. As the motor 4 rotates, a tachometer 5 generates a voltage in accordance with the motor speed. Numeral 6 denotes a spindle mechanism, 7 a spindle, 8 a tool and 9 a gear train for transmitting the rotational motion of the DC motor 4 to the spindle 7. Also provided is a magnetic sensor 10 which, as shown in FIG. 3, comprises a magnetic body 10a, a sensing circuit 10b, and an amplifier 10c. The magnetic sensor 10 will be described in detail below.

Returning to FIG. 1, an orientation control circuit 11 includes a rotational position deviation signal generating circuit 11a which produces a rotational position deviation signal RPD having a voltage level varying in accordance with a position deviation, as well as an orientation end signal ORDEN, and a loop changeover circuit 11b for actuating a loop change-over switch 12 in response to an orientation command from the orientation command circuit 2.

Figure 4:
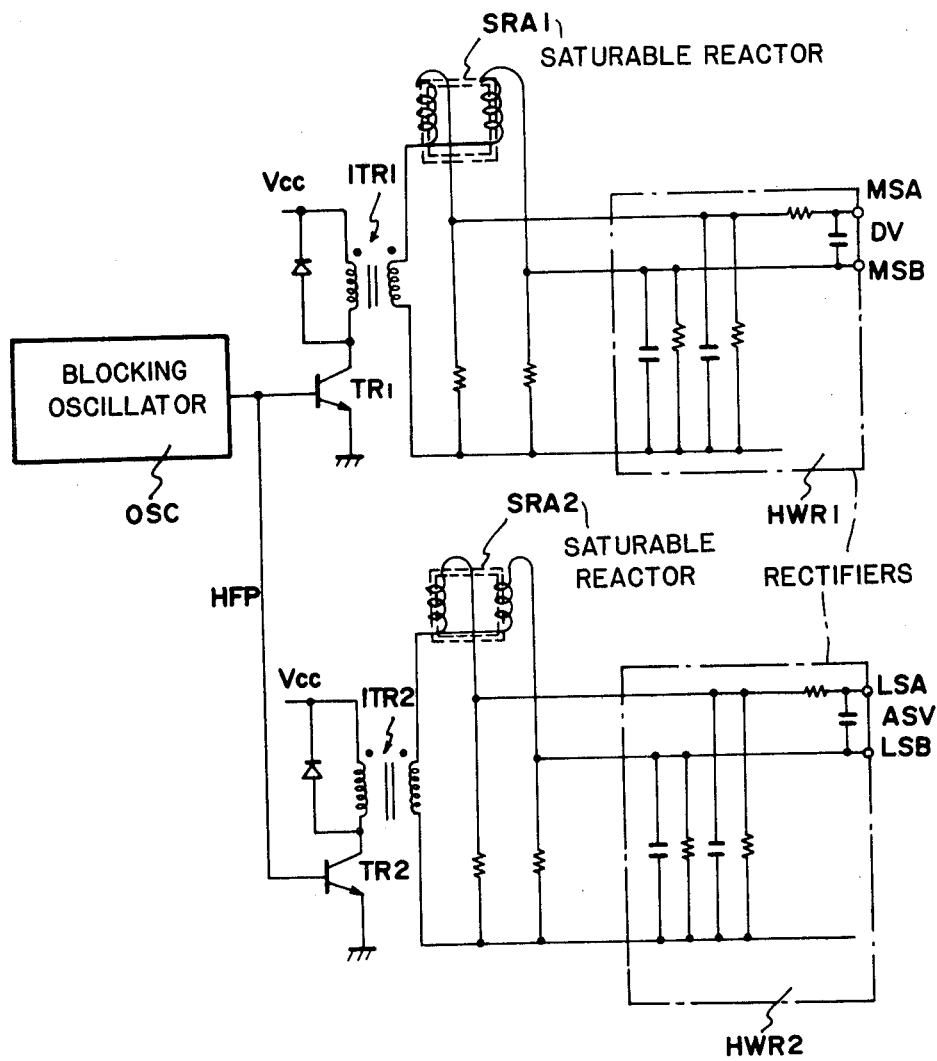
FIG. 4 is a sensing circuit associated with the magnetic sensor of FIG. 3.

Reference will now be had to FIG. 3 to describe the magnetic sensor 10 in detail, and to FIG. 4 for a description of the sensing circuit 10b.

In FIG. 3A, the magnetic body 10a is attached to the spindle at the angular position corresponding to the specified portion which is to be stopped at the commanded orientation. The magnetic body 10a has magnets 10a', 10a'', each having a triangular cross-section, mounted and arranged such that the strength of the magnetic field changes from S to N in the direction of spindle rotation, i.e., in the direction of the arrow.

The sensing circuit 10b is mounted on a stationary portion of the machine so as to detect the magnetic body 10a, and includes two saturable reactors SRA1, SRA2 (FIG. 4) enclosed in a case. Each saturable reactor SRA1 and SRA2 has coils wound on a core, with the coil terminals differentially and cumulatively connected to produce a cumulative output signal and a differential output signal. Specifically, as shown in FIG. 3(B), the signal MS1 is obtained from one coil, and the signal MS2 from the other coil. The cumulatively connected coils provide a cumulative output signal DV, having a substantially S-shaped form as depicted in FIG. 3(C), and the differentially connected coils provide a differential output signal ASV which is illustrated in FIG. 3(D).

As mentioned above, the magnetic body 10a is attached to the specified portion of the spindle, and the sensing circuit 10b is fixed at a stationary position corresponding to the predetermined angular position or orientation. Therefore, the cumulative output signal DV is a voltage waveform having a value of zero volt when the center line of the magnetic body 10a coincides with the center line of the sensing circuit 10b. The waveform is positive on one side of the zero value and negative on the other side; that is, the waveform crosses the zero level. In other words, when the specified portion of the spindle is close to the predetermined orientation, the cumulative output signal DV has a shape which conforms to the deviation from the predetermined orientation. Accordingly, the signal DV is referred to as a fine position deviation signal hereinafter. The differential output signal ASV, on the other hand, is positive in the vicinity of the predetermined orientation and is referred to as an approach signal hereinafter.

Referring to FIG. 4, the sensing circuit comprises a blocking oscillator OSC for generating a high-frequency (100 kHz) pulsed signal HFP, switching transistors $TR_1$ and $TR_2$, isolating transformers $ITR_1$ and $ITR_2$, and rectifiers $HWR_1$ and $HWR_2$. The saturable reactors SRA1 and SRA2 are excited by the high-frequency pulsed signal HFP through the isolating transformers $ITR_1$ and $ITR_2$. As a result, the fine position deviation signal DV corresponding to the angular position of the magnetic body 10a, and the approach signal ASV, are obtained across the terminals MSA and MSB and across the terminals LSA and LSB, respectively.

The position deviation signal generating circuit 11a shown in FIG. 1 will now be described in conjunction with the waveforms depicted in FIG. 2(A).

As described above, the magnetic sensor produces the fine position deviation signal DV and the approach signal ASV, both of which are applied to the position deviation signal generating circuit 11a. Also, the signal AV, indicative of the actual speed of the DC motor 4, enters the circuit 11a from the tachometer 5 and is integrated within the circuit 11a. The result of the integration operation is subtracted from an initially set voltage ISV which will be described below (ISV having a value $-V_i$ during forward spindle rotation, and a value $+V_i$ during reverse spindle rotation). The result of the subtraction operation is a coarse position deviation signal CPD. The position deviation signal generating circuit 11a is adapted to form the constant initially set voltage ISV and a bias signal BIS. The voltage value $V_i$ of the voltage ISV is set so as to be equal to a position deviation voltage which corresponds to one revolution (360°) of the spindle.

The position deviation signal generating circuit 11a produces the initially set voltage ISV from the time the orientation command signal ORCM is generated until the time that the spindle initially reaches the predetermined orientation. It will be assumed here that the value of ISV is $-V_i$, i.e., that the orientation operation is performed while the spindle is rotating in the forward direction. As the spindle continues to rotate and the magnetic body 10a (the specified portion of the spindle) approaches the predetermined orientation for the second time (that is, the approach immediately following the initial approach), the coarse deviation signal CPD (negative polarity) is produced until the magnetic body 10a reaches a first proximal region $AR_1$, the bias signal BIS $(= -B_i)$ is produced until the magnetic body 10a reaches a second proximal region $AR_2$, and the fine position deviation signal DV is produced after the magnetic body 10a has entered the region $AR_2$. Thus, the position deviation signal RPD has a negative polarity and the overall shape as shown in FIG. 2(A) when the orientation operation is executed during forward spindle rotation. It should be noted that the component corresponding the bias signal waveform BIS can be eliminated from the signal RPD if so desired by setting $\theta_2$ equal to $\theta_1$.

Figure 2A:
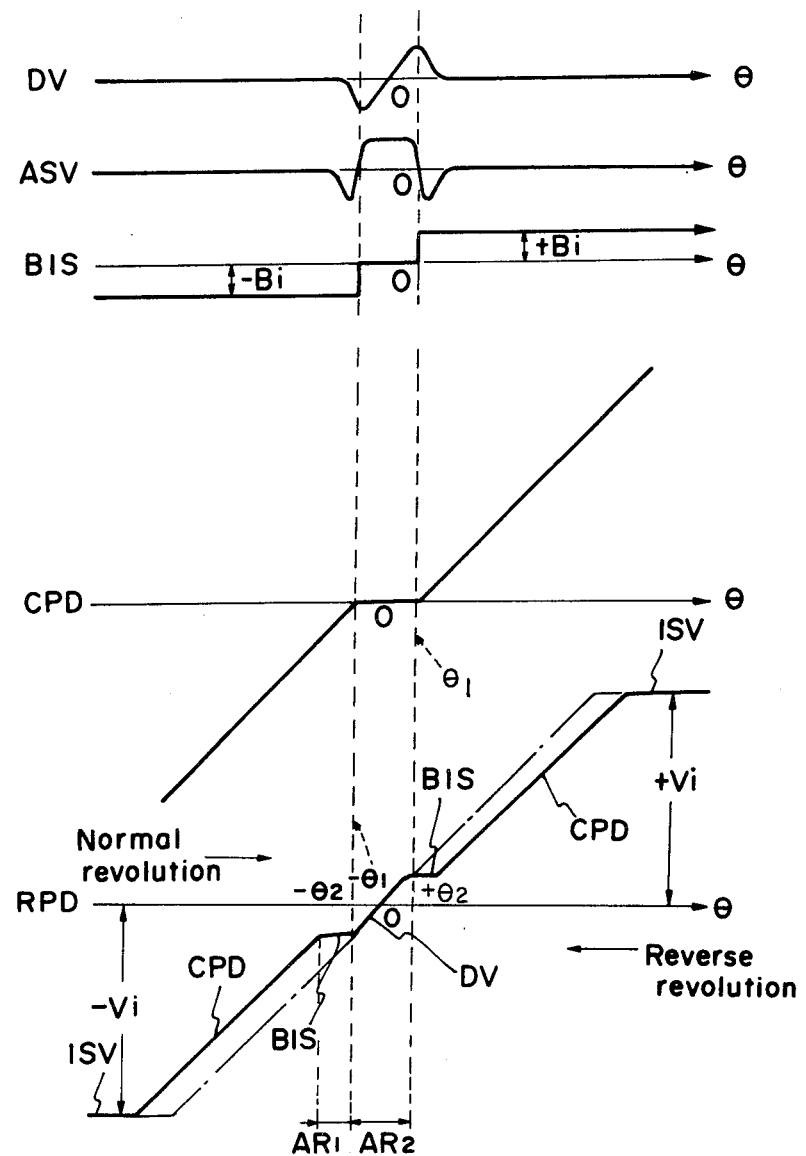
FIG. 2(A) and 2(B) are waveform diagrams showing signals associated with the circuit of FIG. 1.

When the orientation operation is executed during reverse rotation of the spindle, ISV takes on the value $+V_i$, the coarse position deviation signal takes on a positive polarity represented by the CPD component having the positive polarity, and BIS takes on the value $+B_i$, whereby the position deviation signal RPD has a positive polarity and the overall shape shown on the right-hand side of FIG. 2(A).

Figure 2B:
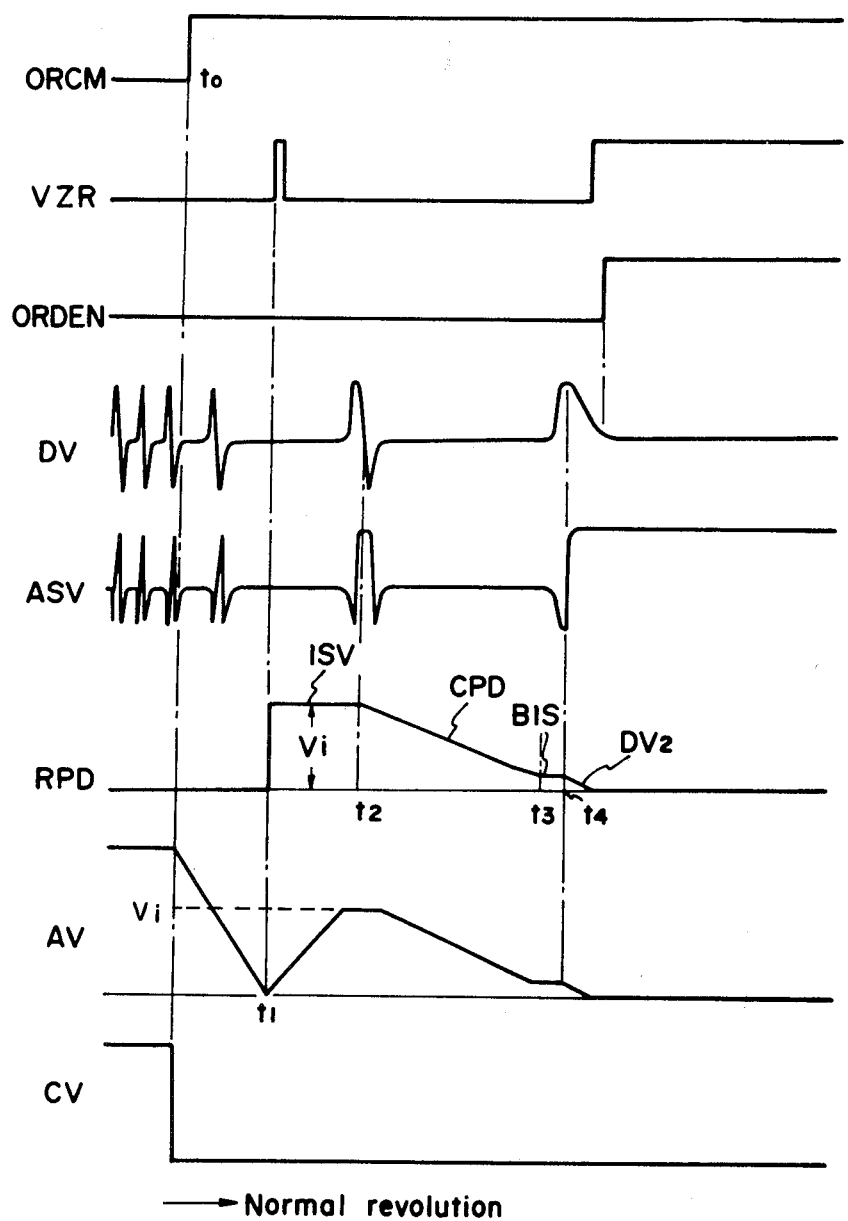

Next, with reference to FIG. 2(B) to the operation of the control circuit shown in FIG. 1 for a case where the spindle is to be stopped at the predetermined angular position during forward rotation is described. It should be noted that FIG. 2(B) shows the absolute value of the position deviation signal RPD.

During rotation of the motor the changeover switch 12 is connected to the a side in FIG. 1, thereby forming a speed control loop. More specifically, the adder 3a receives the speed command signal CV from the speed command circuit 1 and the actual speed signal AV from the tachometer 5, and responds by delivering a speed deviation voltage. The voltage-to-phase converter 3c controls the firing angle of the thyristors in the thyristor circuit 3d in accordance with the speed deviation voltage, the thyristor circuit 3d thereby regulating the voltage applied to the DC motor 4. As a result, the actual speed AV of the DC motor 4 is regulated to bring it into coincidence with the command speed CV. Thereafter the speed control loop regulates the speed of the motor 4 such that the speed deviation approaches zero. Thus, the motor and the spindle, rotated thereby, rotate at the command speed during speed control mode operation.

When the machining work is completed, a control device such as a numerical control device instructs the orientation command circuit 2 to apply the orientation command signal ORCM to the loop changeover circuit 11b at time $t_0$, the speed command signal CV becoming zero at this time. The actual speed AV consequently decreases and reaches zero (or a predetermined constant value) at time $t_1$. When this occurs, a pulse signal VZR indicative of zero speed (or the predetermined speed) is generated by the position deviation signal generating circuit 11a, and causes the loop changeover circuit 11b to change the switch 12 over to the b side, so that circuit operation is shifted from the speed control to the position control mode. In response to the pulse VZR, the position deviation signal generating circuit 11a produces the initially set voltage ISV ($=V_i$). In response to this signal the spindle begins to be rotated again so that the signal AV indicative of actual spindle speed rises to assume the value $V_i$. As the magnetic body 10a (FIG. 3) on the spindle continues to rotate and reaches the predetermined angular position for the first time (time $t_2$), which initiates the position deviation signal generating circuit 11a to generate the coarse position deviation signal CPD. As the spindle continues to rotate and the magnetic body 10a approaches the first proximal region $AR_1$ at time $t_3$, the position deviation signal generating circuit 11a thus produces the bias signal BIS. Then, when the magnetic body reaches the second proximal area $AR_2$ at time $t_4$, the circuit 11a produces the fine position deviation signal DV. When the signal DV reaches zero, namely when the magnetic body 10a (the specified portion of the spindle) is directly opposite the saturable reactor SRA, the orientation operation for stopping the spindle at the predetermined angular position is complete.

Figure 5:
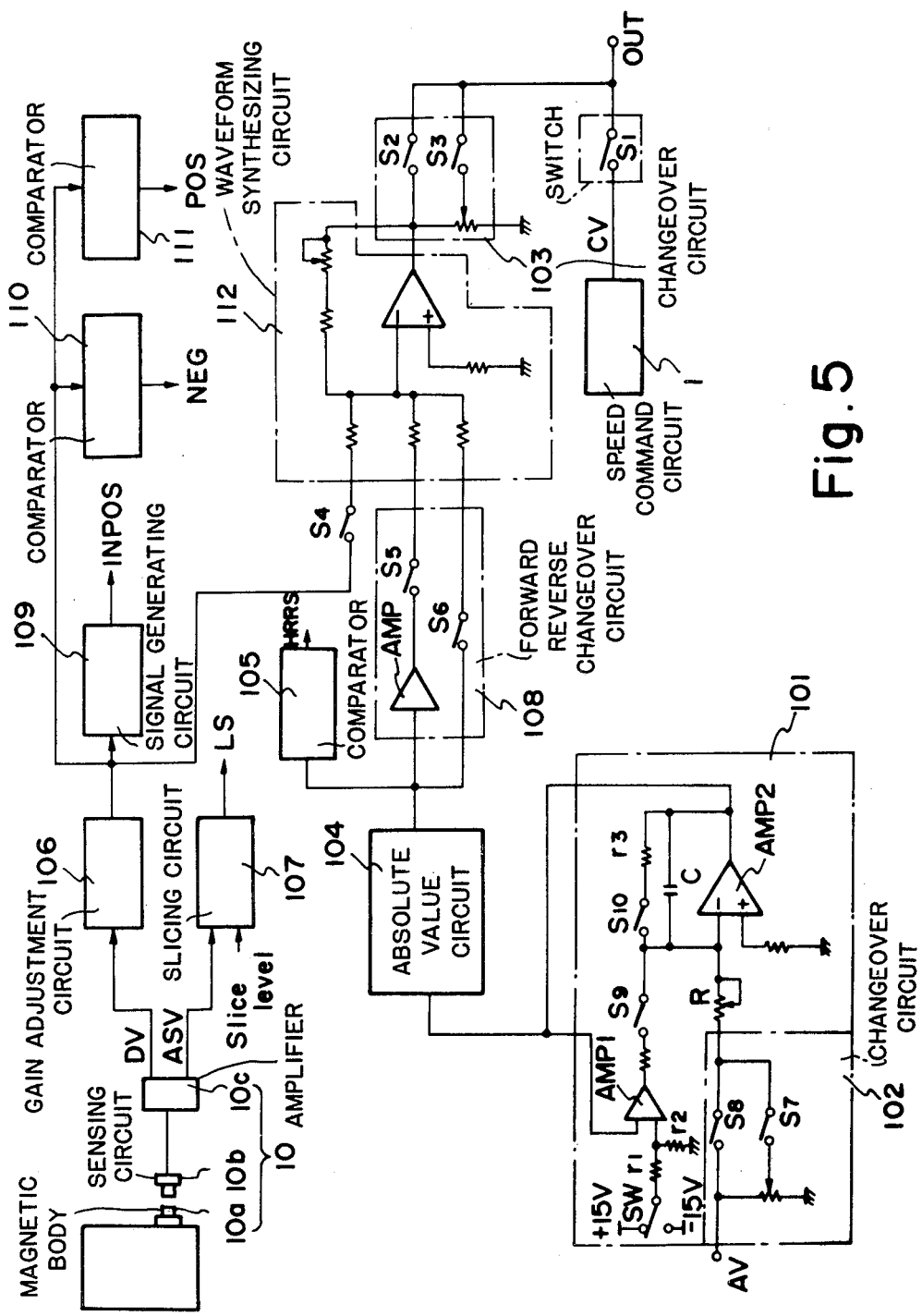
FIG. 5 is a detailed circuit diagram of a circuit for generating a position deviation signal.
Figure 6:
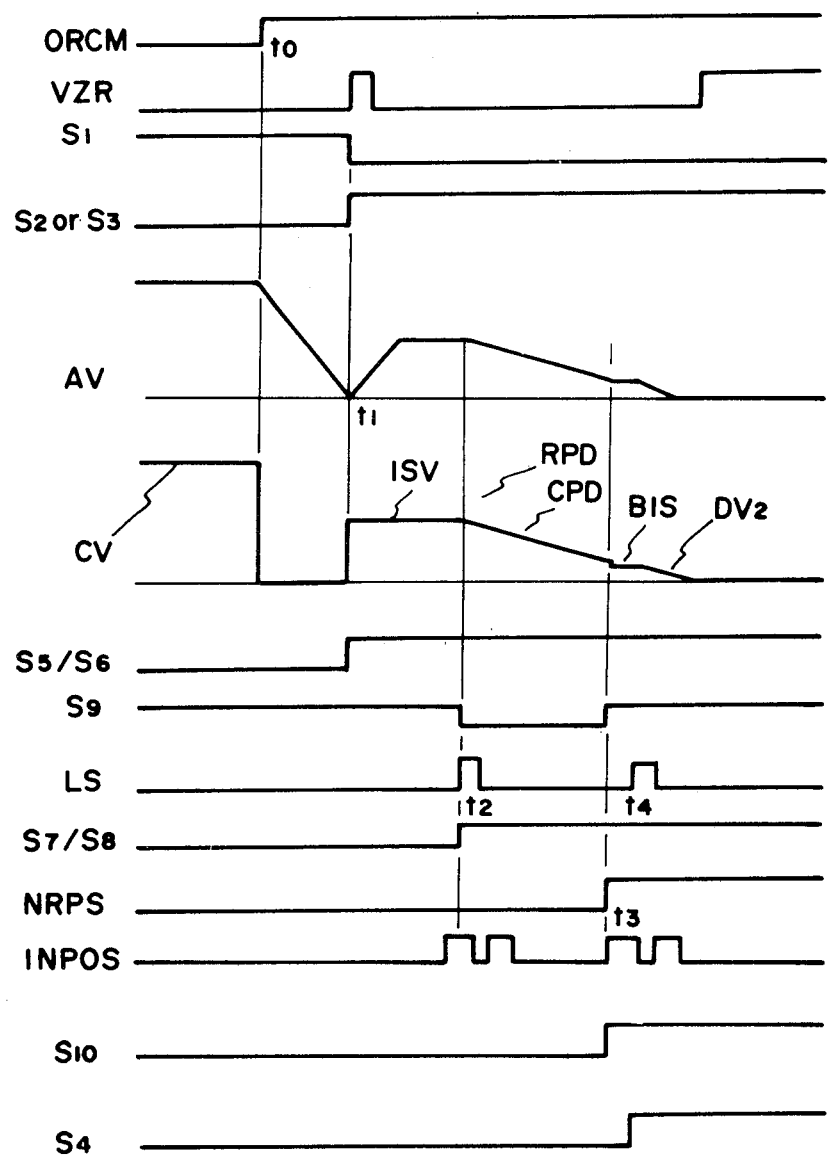
FIG. 6 is a timing chart for the circuit of FIG. 5.

The details of the position deviation signal generating circuit 11a are shown in FIG. 5 which is described with reference to the timing chart shown in FIG. 6. Portions in FIG. 5 identical with those in FIG. 1 are denoted by like reference characters and are not described again here.

In FIG. 5, a circuit 101 is provided to form the initially set voltage ISV and the bias signal BIS, to integrate the actual voltage signal AV, and to subtract the integrated output (indicative of the present position of the spindle) from the initially set voltage ISV. Specifically, a switch SW is connected to $-15$ volts when the spindle is at rest or when the spindle is rotating in the forward direction, or to $+15$ volts when the spindle is rotating in the reverse direction. The selected voltage is fed through an amplifier $AMP_1$ and a switch $S_9$ to charge a capacitor C, the capacitor voltage serving as the voltage $-V_i$ or $+V_i$ of the initially set voltage ISV. When the actual speed signal AV enters the circuit 101 through switch $S_8$ or $S_7$ after the switch $S_9$ has been opened, the capacitor C is charged or discharged, in accordance with the direction in which the spindle is rotating, and the time constant RC. As a result, the coarse position deviation signal CPD is obtained at the output terminal of the amplifier $AMP_2$ due to the subtraction of the integrated actual speed signal AV from the initially set voltage ISV (the amplifier $AMP_2$, R and C forming the integrating circuit). When the switches $S_9$, $S_{10}$ are closed after the signal CPD has reached a predetermined voltage, the circuit 101 acts as an amplifier, and the bias signal BIS of a predetermined level is obtained at the output terminals of the amplifier $AMP_2$. In other words, in accordance with the particular combination and timing of the opening and closing operation of the switches $S_7$ through $S_{10}$, first the initially set voltage ISV is generated delivered, then the coarse position deviation voltage CPD, and finally the bias signal voltage BIS.

Numerals 102, 103 denote changeover circuits for switching gain in accordance with gear ratio. These circuits are operable to set the gain of the position control loop high when the gears between the DC motor 4 and spindle 7 are set low (reduction ratio is high), and to set the gain low when the gears are set high (reduction ratio low), that is, to set the gain low in comparison to the gain for the high reduction ratio. More specifically, when the reduction ratio is high, switches $S_7$, $S_2$ are closed to raise the gain, and when the reduction ratio is low, switches $S_8$, $S_3$ are closed to lower the gain. This eliminates spindle hunting and overshoot when stopping the spindle at the predetermined angular position, and permits the spindle orientation operation to be completed in less time regardless of the size of the reduction ratio.

Denoted by numeral 104 is a well-known absolute value circuit which takes the absolute value of the output from circuit 101. A comparator 105 detects whether or not the coarse position deviation signal CPD has fallen below a predetermined level, and produces a signal NRPS which indicates that the predetermined portion of the spindle (the magnetic body 10a) has approached the first proximal region $AR_1$. The signal NRPS closes the switches $S_9$, $S_{10}$. A gain adjustment circuit 106 adjusts the gain in accordance with the gap between the magnetic body 10a and the sensing circuit 10b, and produces the fine position deviation signal $DV_2$ having a prescribed slope. A slicing circuit 107 slices the approach signal ASV at a predetermined level and produces a signal LS which indicates that the magnetic body 10a has reached the area closely adjacent the predetermined angular position. The signal LS opens the switches $S_5$, $S_6$ and closes the switch $S_4$. As a result, the fine position deviation signal DV is delivered as the position deviation signal RPD.

In the forward-reverse changeover circuit 108 switch $S_5$ is closed when the spindle is controlled for orientation by rotating it in the forward direction, and switch $S_6$ is closed when the spindle is controlled for orientation by rotating it in the reverse direction. An "in-position" signal generating circuit 109, comprising a comparator, monitors the fine position deviation signal DV and generates the in-position signal INPOS when the spindle is within the range of the predetermined angular position. The signal INPOS is sent to the numerical control device as a signal indicating completion of the orientation operation. Comparators 110 and 111 monitor the fine position deviation signal DV and produce signals NEG, POS upon detecting whether the spindle is approaching the predetermined angular position while rotating in the reverse direction (signal NEG at logical "1"), or while rotating in the forward direction (signal POS at logical "1"), respectively. Either switch $S_5$ or switch $S_6$ will close in response to the signals NEG, POS. A waveform synthesizing circuit 112 delivers either the fine position deviation signal or the coarse position deviation signal in accordance with the open or closed states of the switches $S_4$, $S_5$ or $S_6$.

In summary, when the orientation command signal ORCM goes to logical "1" at time $t_0$, the command speed signal CV drops to zero volts, so that the actual speed AV decreases, to zero at time $t_1$. At this time the zero speed signal VZR goes to logical "1", switch $S_1$ opens, one of the switches $S_2$, $S_3$ closes in accordance with the low/high setting of the gears, and one of the switches $S_5$, $S_6$ closes in accordance with the direction, either forward or reverse, of spindle rotation. This forms a position control loop whose output terminal OUT provides the initially set voltage ISV. It should be noted that switch $S_9$ is closed and that switches $S_7$, $S_8$ and $S_{10}$ are open.

In response to the voltage ISV, the motor begins rotating again so that the spindle is rotated and reaches the predetermined angular position for the first time (i.e., the signal LS is a "1", and the in-position signal INPOS is a "1"). Hence, at time $t_2$, switch $S_9$ is opened and one of the switches $S_7$, $S_8$ is closed in accordance with the low/high setting of the gears. Therefore the coarse position deviation signal CPD is provided at the output terminal OUT. Thereafter, as the actual speed AV and the positional error decrease and the spindle approaches the area in the vicinity of the predetermined angular position (time $t_3$), the comparator 105 issues the signal NRPS (logical "1"), whereby the switches $S_9$, $S_{10}$ are closed. As a result, the bias signal of the prescribed level is provided at the output terminal OUT. As the spindle continues to be rotate at a slower speed and arrives at the vicinity of the predetermined angular position (time $t_4$), the signal LS goes to the "1" level, switches $S_5$, $S_6$ are opened, and switch $S_4$ is closed. Hence, the fine position deviation signal DV is provided at the output terminal OUT.

It should be noted that the spindle orientation control operation need not be initiated in response to the spindle speed dropping to zero, as in the above case. It is possible to initiate the operation after a value other than zero has been attained.

In accordance with the present invention as described and illustrated above, a spindle can be accurately stopped at a predetermined angular position without relying upon contacting parts such as a mechanical brake. A highly accurate magnetic sensor is provided and adapted to produce a fine position deviation signal when a specified portion of the spindle has reached the vicinity of the predetermined angular position, whereby an extremely high accuracy on the order of from $\pm 0.03°$ to $\pm 0.05°$ can be obtained, as confirmed by measurements. Moreover, the magnetic sensor is simple in construction and capable of being manufactured at low cost.

Although the invention has been described in its preferred form with a certain degree of particularity, it is obvious that many modifications and variations are possible in the light of the above teachings. It is therefore to be understood that within the scope of the appended claims, the invention may be practiced otherwise than as specifically described.

What we claim is:

1. A spindle orientation control apparatus operatively connected to receive an orientation command signal and a speed command signal, comprising:
   a spindle having an angular position and a specified rotational direction;
   a motor having an actual speed, operatively connected to said spindle;
   speed control means having an input operatively connected to receive said speed command signal and an output operatively connected to said motor, for controlling the actual speed of said motor and for feeding back the actual speed of said motor to said input of said speed control means;
   orientation control means, having a first input operatively connected to receive the orientation command signal, having a second input operatively connected to said spindle, and having an output, for selectively providing at said output one of a coarse position deviation signal responsive to the integral of the actual speed of said motor and a fine position deviation signal;
   switching means, operatively connected between said output of said orientation control means and said input of said speed control means, for selectively providing, as an output to said speed control means, one of said speed command signal and said output of said orientation control means, in response to the orientation command signal; and
   magnetic sensing means, operatively connected between said spindle and said second input of said orientation control means, for generating the fine position deviation signal responsive to the difference between a predetermined angular position of said spindle and the current position of said spindle, and for generating an approach signal responsive to a specified portion of said spindle being in the vicinity of said predetermined angular position of said spindle;
   said magnetic sensing means comprising:
   a magnetic body, operatively connected to said spindle, including at least two magnets having magnetic fields and arranged such that the strengths of the respective magnetic fields change from south to north in the direction of said specified rotational direction of said spindle; and
   a sensing circuit, operatively connected to said orientation control means and positioned near said spindle, for sensing said magnetic body, and including two saturable reactors having coils wound thereon, for producing said fine position deviation signal and said approach signal, respectively.

2. A spindle orientation control apparatus according to claim 1, wherein the difference between the predetermined angular position of said spindle and the current position of said spindle is reduced to an amount within the range of $\pm 0.03°$ to $\pm 0.05°$.

3. A spindle orientation control apparatus operatively connected to receive an orientation command signal, comprising:
   a spindle having an angular position and a specified rotational direction;
   a motor having an actual speed, operatively connected to drive said spindle;
   a speed command circuit, operatively connected to said motor, for generating a speed command;
   a speed control circuit, operatively connected between said motor and said speed command circuit, comprising a speed control loop for feeding back the actual speed of said motor;
   a magnetic sensor, operatively connected to said speed control circuit and to said spindle, for generating a fine position deviation signal responsive to the deviation from a predetermined angular position by the angular position of said spindle, and for generating an approach signal responsive when a specific portion of the spindle is in the vicinity of the predetermined angular position, said magnetic sensor comprising:

- a magnetic body provided on said spindle, having a magnetic strength varying in the direction of the specified rotational direction; and
- a sensing circuit having two saturable reactors having coils wound thereon in a cumulative and differential manner, respectively, positioned to sense said magnetic body;

an orientation control circuit, operatively connected to said magnetic sensor, said motor and said speed control circuit and operatively connected to receive the orientation command signal, for selectively delivering, as an output, one of a coarse position deviation signal, in response to the integral of the actual speed of said motor, and the fine position deviation signal, in accordance with the approach signal; and switching means operatively connected to said orientation control circuit, said speed control circuit and said speed command circuit, for selectively supplying said speed command or the output of said orientation control circuit to said speed control circuit in response to the orientation command signal.

4. A spindle orientation control apparatus according to claim 3, wherein the fine position deviation signal and the approach signal are respectively obtained from the coils wound on said two saturable reactors in a cumulative and differential manner.

* * * * *

UNITED STATES PATENT AND TRADEMARK OFFICE
CERTIFICATE OF CORRECTION

PATENT NO. : 4,450,393
DATED : May 22, 1984
INVENTOR(S) : KOHZAI ET AL.

It is certified that error appears in the above-identified patent and that said Letters Patent is hereby corrected as shown below:

```
Column 1, line 26,"tion well" should be --tion are well--;
         "these are machine" should be --these machine--.
Column 2, line 21,"invention for" should be --invention, for--.
Column 4, line 52,"Fig. 2(B) to the" should be --Fig. 2(B)
         the--.
Column 7, line 32,"to be rotate" should be --to rotate--.
```

Signed and Sealed this

Thirteenth Day of November 1984

[SEAL]

Attest:

Attesting Officer

GERALD J. MOSSINGHOFF

Commissioner of Patents and Trademarks